(12) United States Patent
Larsson

(10) Patent No.: US 12,082,297 B2
(45) Date of Patent: Sep. 3, 2024

(54) BACKLOG MECHANISM FOR SUBSCRIBER PROFILES ON EUICCS

(71) Applicant: Giesecke+Devrient Mobile Security Germany GmbH, Munich (DE)

(72) Inventor: Thomas Larsson, Alvsjo (SE)

(73) Assignee: GIESECKE-DEVRIENT MOBILE SECURITY GERMANY GMBH, Munich (DE)

( * ) Notice: Subject to any disclaimer, the term of this patent is extended or adjusted under 35 U.S.C. 154(b) by 47 days.

(21) Appl. No.: 17/852,988

(22) Filed: Jun. 29, 2022

(65) Prior Publication Data

US 2023/0007465 A1 Jan. 5, 2023

(30) Foreign Application Priority Data

Jul. 2, 2021 (EP) ..................................... 21020345

(51) Int. Cl.
*H04W 8/18* (2009.01)
(52) U.S. Cl.
CPC ..................................... *H04W 8/18* (2013.01)
(58) Field of Classification Search
CPC ....................................................... H04W 8/18
USPC ......................................................... 455/418
See application file for complete search history.

(56) References Cited

U.S. PATENT DOCUMENTS

| | | | |
|---|---|---|---|
| 9,092,775 B2 | 7/2015 | Bernard et al. | |
| 10,911,939 B2 | 2/2021 | Zhang et al. | |
| 2011/0126183 A1 | 5/2011 | Bernard et al. | |
| 2017/0295449 A1 | 10/2017 | Pereira et al. | |
| 2019/0007082 A1* | 1/2019 | Dumoulin | H04B 1/3816 |
| 2019/0208407 A1* | 7/2019 | Ding | H04W 8/205 |
| 2020/0374686 A1* | 11/2020 | Zhang | H04L 67/30 |
| 2021/0112402 A1* | 4/2021 | Ullah | H04W 12/041 |
| 2021/0392491 A1* | 12/2021 | Chen | H04W 8/183 |

FOREIGN PATENT DOCUMENTS

| | | | |
|---|---|---|---|
| EP | 2318921 B1 | 5/2017 | |
| EP | 3629611 A1 | 1/2020 | |
| EP | 3739914 A1 | 11/2020 | |

(Continued)

OTHER PUBLICATIONS

GSM Association Non confidential Official Document SGP.22, RSP Technical Specification, Version 2.2.2, Jun. 5, 2020. Retrieved from https://www.gsma.com/esim/resources/sgp-22-v2-2-2/ on Jun. 13, 2022, 268 pages.

(Continued)

*Primary Examiner* — Ahmad F. Matar
*Assistant Examiner* — Jirapon Tulop
(74) *Attorney, Agent, or Firm* — Workman Nydegger

(57) ABSTRACT

Methods and devices are arranged for managing reset and re-downloaded profiles Over-the-Air on an eUICC. An operator system imports a profiles list from a server, each entry in the list comprising a flag indicating whether the corresponding profile has been downloaded onto the eUICC. Upon receiving, from a mobile network operator, MNO, a request to update a profile on the eUICC, the request comprising a profile identifier and an OTA campaign, the operator system performs a backlog of the OTA campaign for the profile indicated by the profile identifier under consideration of the flag in the corresponding profile entry.

16 Claims, 3 Drawing Sheets

(56) References Cited

FOREIGN PATENT DOCUMENTS

| | | |
|---|---|---|
| GB | 2358500 A | 7/2001 |
| WO | 2017182402 A1 | 10/2017 |
| WO | 2018227729 A1 | 12/2018 |

OTHER PUBLICATIONS

Search Report from corresponding European Application No. 21020345.1, Dec. 23, 2021.
GSM Association, "Remote Provisioning Architecture for Embedded UICC Test Specification," The Walbrook Building, Jul. 14, 2020, 798 pages.

* cited by examiner

BACKLOG MECHANISM FOR SUBSCRIBER PROFILES ON EUICCS

BACKGROUND OF THE INVENTION

The present invention relates to embedded secure elements, such as embedded Universal Integrated Circuit Cards, eUICCs, and more particularly to managing reset and re-downloaded profiles on an eUICC Over-the-Air.

Recently, mobile devices configured to employ electronic subscriber profiles for communicating on mobile networks have emerged. Such mobile devices are typically equipped with electronic/embedded secure element devices, such as electronic/embedded universal integrated circuit cards (eUICCs), configured to store one or more electronic subscriber profiles such as electronic subscriber identification module (eSIM) profiles that may allow mobile devices to connect to one or more mobile networks. A subscriber profile (e.g., eSIM profile) may be generated by a mobile network operator (MNO) and may be downloaded to a mobile network device or user terminal. The subscriber profile may then be installed on a secure element of the mobile device and used for communication over a corresponding mobile network by the mobile device.

FIG. 1 shows a simplified representation of the architecture of a remote eSIM provisioning system as described in SGP.22 RSP Technical Specification, Version 2.2.2, issued by the GSM Association. The eSIM provisioning system 100 is organized around several elements: the profile server SM-DP+ (Subscription Manager—Data Preparation and Secure Routing server, 110), the SM-DS (Subscription Manager—Discovery server, 160), the LPA (Local Profile Assistance, 140) and the eUICC, 130, the latter being part of a mobile device 150, of an end user 170. The eUICC is manufactured by the eUICC manufacturer EUM 180. The profile server SM-DP+ 110 is responsible for the creation, download, remote management (enable, disable, update, delete) and the protection of subscriber profiles provided by the MNO 120. The LPA (Local Profile Assistant, 140) is a set of functions in the device 150 responsible for providing the capability to download (encrypted) profiles to the eUICC 130. It also presents the local management end user interface to the end user 170 so they can manage the status of profiles on the eUICC 130. The SM-DS 160 provides means for the SM-DP+ 110 to communicate with the eUICC 130.

The profiles are loaded into the eUICC 130 by the SM-DP+ server 110 and managed in the eUICC 130 (e.g., by commands) either directly through the channel or interface ES8+ (i.e., channel 111 up to the eUICC) or indirectly through the channel or interface ES9+ (i.e., channel 113 only up to the end device 150, and there into the LPAd 140) and the channel or interface ES10b (i.e., continuation 115 of ES9+ to reach further into the eUICC).

Through another channel, namely over the interface ES6 identified by reference numeral 114 in FIG. 1, the Mobile Network Operator MNO 120 can also initiate changes to profiles loaded onto the eUICC 130. A change action on the side of the MNO is also referred to as an OTA campaign.

Since the SM-DP+ server 110 and the MNO 120 communicate with the eUICC 130 via different channels, inconsistencies in profiles may occur. For example, the SM-DP+ server 110 may load a new profile onto the eUICC to replace or update an existing profile within the eUICC. Changes that have been undertaken before on the previous profile, such as updates on the profile settings, which may include critical information like VoIP identifiers and network settings, will be lost after the profile is updated or reset.

In addition, a user may delete an existing profile, either on purpose or by mistake, and later on re-download the profile from the server. Any updates on the previous profile will be lost as well.

It is therefore desirable to provide an update mechanism for eUICC profiles which addresses the above-mentioned drawbacks.

SUMMARY

According to a first aspect of the present invention, there is provided a method for backlogging subscriber profiles on an embedded universal integrated circuit card, eUICC, by an operator system. The method comprises in a first step importing a profiles list from a server, each entry in the list comprising a flag indicating whether the corresponding profile has been downloaded onto the eUICC. Upon receiving, from a mobile network operator, MNO, a request to update a profile on the eUICC, the request comprising a profile identifier and an OTA campaign, the operator system performs a backlog of the OTA campaign for the profile indicated by the profile identifier under consideration of the flag in the corresponding profile entry.

The proposed solution allows to tag the profiles list, also referred to as a CPS (Card Personalization System) file, with a flag and thus, to keep track for all profiles contained in the CPS file whether they have been downloaded onto the eUICC. The flag set for a certain profile may thus indicate to the operator system that the profile is an eSIM profile (and not a regular UICC profile) and has not yet been downloaded onto the eUICC.

Preferably the profile identifier is a unique serial number, ICCID (Integrated Circuit Card ID), uniquely identifying a profile.

Preferably, the step of importing a profiles list comprises requesting from the server a list of profiles supported by the eUICC and storing the received list of profiles within a memory of the operator system.

The operator system may be part of the MNO.

In some embodiments of the present invention, the step of performing a backlog of the OTA campaign comprises searching in the profiles list for an entry corresponding to the received profile identifier, checking the corresponding flag, and storing the OTA campaign in the profile entry.

In some embodiments of the present invention, the OTA campaign is stored only if the profile has not yet been downloaded onto the eUICC. That is, the operator system checks the flag of the entry corresponding to the profile identifier, and stores the OTA campaign if the flag indicates that the corresponding profile has not been downloaded onto the eUICC.

In some embodiments of the present invention, if the flag indicates that the profile has been downloaded, the operator systems sends the OTA campaign to the eUICC.

Employing a flag allows to prevent the OTA system from requesting unnecessary OTA updates to a profile which does not exist on the eUICC. Only updates for a profile already downloaded onto the eUICC will be sent to the eUICC. On the other hand, updates that are sent to the eUICC may not be backlogged, reducing thus the memory consumption at the operator system.

In some embodiments of the present invention, when a download complete notification is received from the server, indicating a profile that has been downloaded onto the eUICC, the operator system searches the profiles list for a backlog corresponding to the indicated profile, and provides the backlogged OTA campaign, that is, the OTA campaign stored in the backlog, to the eUICC.

This will allow an MNO to keep the eSIM profiles on an eUICC or SIMcard updated with the latest, sometimes critical, information—even if an eSIM profile is re-downloaded. An efficient solution is thus provided for keeping all profile settings up to date when redownloading eSIM profiles, especially when switching phones, or when a factory reset is performed.

In some embodiments of the present invention, the OTA campaign comprises at least one remote file management command, in particular, an APDU command, for performing remote management on profiles stored on the eUICC.

Preferably, performing a backlog of the OTA campaign comprises storing the at least one remote file management command for the respective profile in the profiles list.

In some embodiments of the present invention, upon receiving the download complete notification from the server, indicating a profile which has been downloaded onto the eUICC, the flag in the entry corresponding to the downloaded profile is updated, to indicate that the profile has been downloaded.

In some embodiments of the present invention, a delete notification is received at the operator system from the server, indicating a profile which has been deleted from the eUICC. This cause the operator system to update the flag in the profiles list entry corresponding to the deleted profile, to indicate the profile as not downloaded onto the eUICC.

In this way the flag is reset if a profile has been deleted from the eUICC, to indicate the profile as not being currently downloaded onto the eUICC.

In some embodiments of the present invention, each entry in the profiles list comprises a timestamp indicating an update of the corresponding profile. Particularly, the timestamp indicates an update of the profile at the server.

This allows the backlog to function as a repository of past updates of a profile, with respect to the chronological order of the performed updates. Keeping and managing the backlog by the operations described above, allow the backlog to grow and to be actualized such that it can efficiently be reused every time the profile is re-loaded or transferred to a new device.

In some embodiments of the present invention, a profile update notification is received at the operator system from the server, the profile update notification comprising a new timestamp, indicating the last update of the profile performed at the server. The profile update may comprise at least an upgrade of an existing profile within the eUICC, or a replacement of a profile within the eUICC with a new profile. Subsequently, the operator system clears the backlog of the updated profile from the profiles list. Preferably, the backlog of the updated profile is cleared by deleting all backlog entries from the profiles list corresponding to the updated profile with timestamps older than the new timestamp.

In this way, the backlog is dynamically adapted to any changes performed on profiles, and memory space at the operator system is efficiently managed.

According to a second aspect of the present invention, there is provided an apparatus for backlogging subscriber profiles on an embedded universal integrated circuit card (eUICC). The apparatus is configured to import a profiles list from a server, wherein each entry in the list comprises a flag indicating whether the corresponding profile has been downloaded onto the eUICC; to receive, from a mobile network operator, MNO, a request to update a profile on the eUICC, the request comprising a profile identifier and an OTA campaign; and to perform a backlog of the OTA campaign for the profile indicated by the profile identifier under consideration of the flag in the corresponding profile entry.

In some embodiments of the present invention according to the second aspect, the apparatus is configured upon receiving a download complete notification from the server, indicating a profile that has been downloaded onto the eUICC, to search the profiles list for a backlog corresponding to the indicated profile; and to provide the backlogged OTA campaign, stored in the backlog, to the eUICC.

In some embodiments of the present invention according to the second aspect, the apparatus is configured to receive a profile delete notification from the server, and to update the flag in the entry corresponding to the deleted profile in the profiles list, to indicate the profile as not downloaded onto the eUICC.

In some embodiments of the present invention according to the second aspect, the apparatus is configured to receive a profile update notification from the server, the profile update notification comprising a new timestamp, indicating the last update of the profile; and to clear the backlog of the updated profile from the profiles list according to the new timestamp.

According to a third aspect of the present invention, there is provided a remote eUICC profile management system, comprising a mobile network operator, MNO, the MNO comprising an operator system; a server, in particular a Subscription Manager—Data Preparation and Secure Routing, SM-DP+ Server, a mobile device, the mobile device comprising an embedded Universal Integrated Circuit Card (eUICC) and a Local Profile Assistant, LPA; a first interface between the operator system and the server; and a second interface between the operator system and the eUICC. The operator system is configured to receive over the first interface a profiles list and a plurality of messages indicating a status of a profile at the server, to implement the method according to the first aspect, and to provide over the second interface a backlogged OTA campaign order to the eUICC, indicating updates to a profile to be performed at the eUICC.

In some embodiments the eUICC is configured upon receiving the backlogged OTA campaign, to update the profile currently downloaded. Preferably, the update is performed using a command, in particular an APDU command, contained within the OTA campaign.

This ensures that even after re-downloading a profile all updates previously effected by the MNO will be replayed at the eUICC, providing thus the user with a profile having the most actual update state.

The aspects and embodiments described herein will allow mobile network operators (MNOs) to keep profiles on the eUICC updated with the latest, sometimes critical, information, even if the eUICC profile is re-downloaded. This will facilitate the process of redownloading profiles between mobile devices as well as performing a factory reset while ensuring the latest updates to a profile are preserved.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
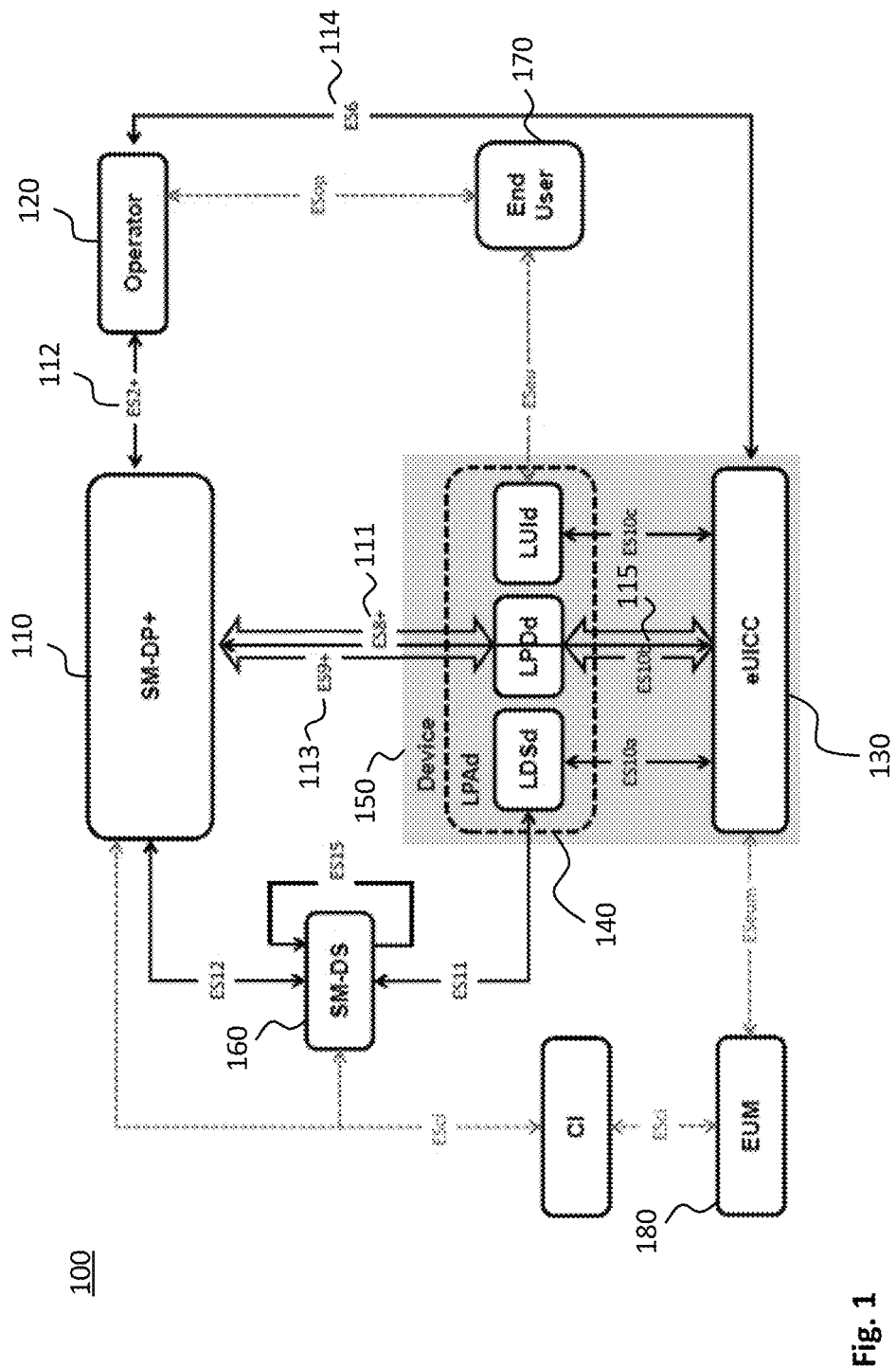
FIG. 1 shows a schematic structural diagram of an eUICC profile management sytem.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Through this specification, the term "eUICC" is understood as an integrated circuit, IC, that is intended to securely store at least one subscription profile having profile data. A profile in an eUICC may host an international mobile subscriber identity number, IMSI, a unique serial number, ICCID, cryptographic encryption/decryption keys, security authentication and ciphering information, temporary information related to the local network, a list of the services the user has access to, and two passwords: a personal identification number (PIN) for ordinary use, and a personal unblocking code (PUK) for PIN unlocking, which are used to uniquely identify and authenticate a subscriber on a terminal device, such as an M2M device, a mobile phone, a personal computer and so on. In addition, a profile in an eUICC may contain a profile name or identifier.

The present invention proposes an update mechanism for eUICC profiles in a mobile terminal, which supports OTA updating of (re-)downloaded profiles, such that changes which have been made to a previously existing profile on the eUICC can be efficiently applied to the new profile.

Figure 2:
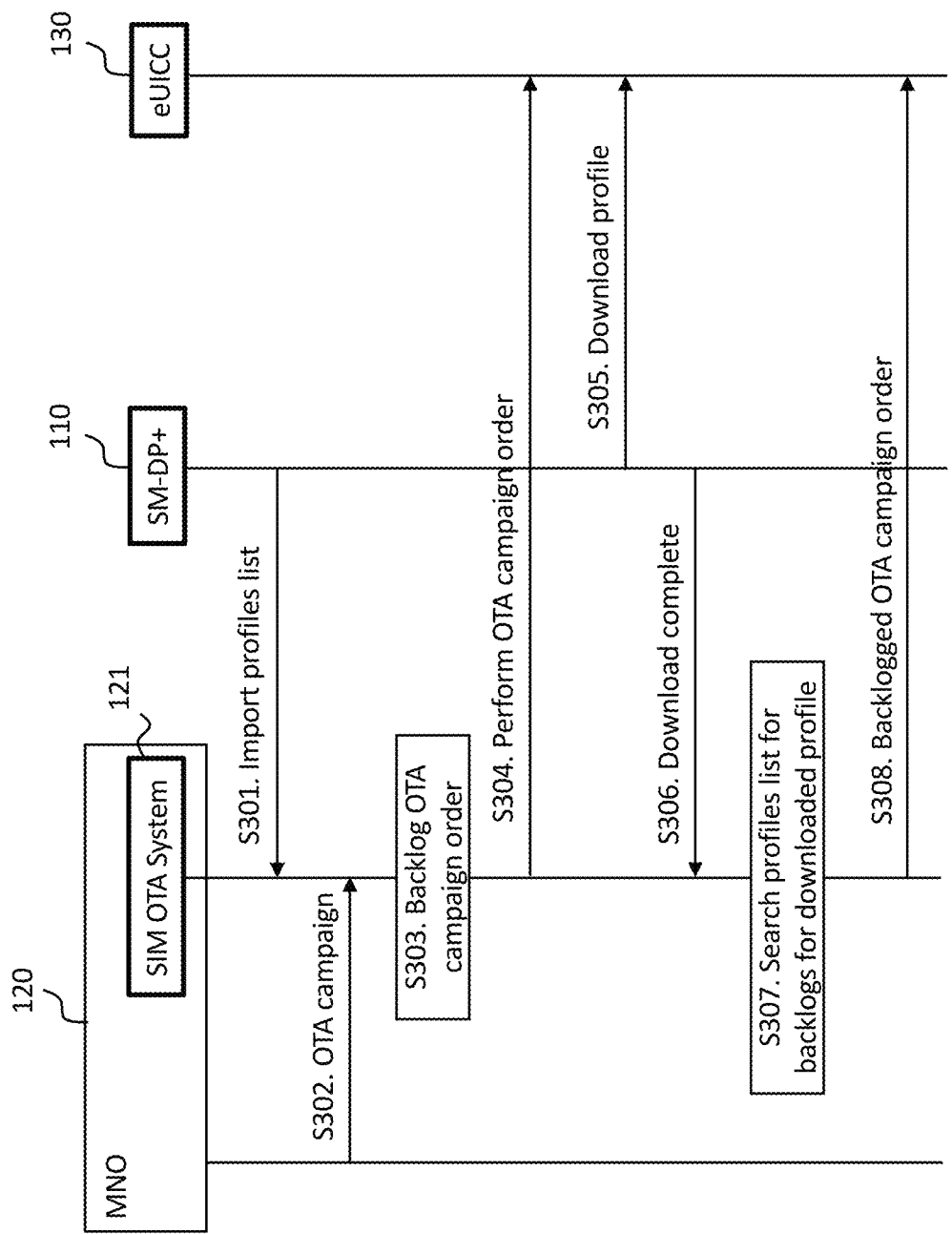
FIG. 2 shows a flow chart of a method for updating subscriber profiles on an eUICC according to an embodiment.

FIG. 2 shows a flow chart of a method for updating subscriber profiles on an eUICC according to an embodiment. The method may be carried out on the eUICC system of FIG. 1.

The main actor is the SIM OTA system 121, which functions as an operator server of the MNO 120. Particularly, the OTA system 121 supports remote management of eUICCs, such as for instance, providing network-specific services, update and reconfiguration of profiles within the eUICC.

With reference to FIG. 2, the OTA system 121 imports in a first step S301 from the server 110 a list of profiles, supported for the eUICC 130. The list of profiles is a file containing a description of the eUICC profiles, including file structure and keys for every eUICC or eSIM that allows OTA operations later in the field to be remotely performed from the OTA system 121. The list of profiles may also be referred to as a CPS (Card Personalization System) file, as it contains combined knowledge of profile and card specific data (e.g., keys).

In an embodiment, in addition to data needed for card personalization, the CSP file (list of profiles) may be tagged with a flag and a timestamp. Preferably, each entry in the list of profiles comprises a flag indicating whether the corresponding profile has been downloaded onto the eUICC. That is, for a profile (eSIM) P1, the flag may carry the value "NOT-Yet-Downloaded-P1" to indicate that the profile P1 has not been downloaded yet onto the eUICC. Alternatively, the flag may carry a Boolean value, indicating the status of the corresponding profile, e.g., downloaded="1", not downloaded="0", or vice versa.

In addition to the flag, each entry of the profiles list may comprise a timestamp, indicating the version of the respective profile. The role of the timestamp will be explained below with reference to FIG. 3.

Preferably, the step S303 of importing a profiles list comprises requesting from the server a list of profiles supported by the eUICC and storing the received list of profiles within a memory of the OTA system.

In a further step, S302, the OTA system may receive from the MNO 120 a request to update a profile on the eUICC 130. The request may comprise a profile identifier and an OTA campaign.

The OTA campaign denotes a change request and may comprises at least one remote file management command, in particular, an APDU command, for performing remote management on the profile identified by the profile identifier.

When the OTA system 121 receives an OTA campaign order targeting a particular profile, the OTA system will recognize the profile as being an eSIM by checking the profiles list, and the OTA campaign (respectively the APDUs stored therein) will be recorded in a backlog and stored per profile within the OTA system, as illustrated by step S303 in FIG. 2. The OTA campaign may be stored within the profiles list, for instance, as a further field within the list entry of the respective profile. Alternatively, the OTA campaign can be stored in a separate data structure and linked to the corresponding profile in the list of profiles, preferably through pointer variables.

In some embodiments of the present invention, the OTA campaign is stored only if the profile has not yet been downloaded onto the eUICC. That is, the OTA operator system 121 checks the flag of the entry corresponding to the profile identifier, and stores the OTA campaign if the flag indicates that the corresponding profile has not been downloaded onto the eUICC.

In case the flag indicates that the corresponding profile has already been downloaded onto the eUICC, the OTA system 121 sends in step 5304 the OTA campaign to the eUICC 130 to be executed thereon.

Thus, the flag allows to prevent the OTA system from requesting unnecessary OTA updates to a profile which does not exist on the eUICC. Only updates, received through the OTA campaign from the MNO, for a profile already downloaded onto the eUICC will be sent to the eUICC. On the other hand, updates to be performed for not yet downloaded profiles are stored at the operator system for being later on forwarded to the eUICC after the profiles have been downloaded onto the eUICC.

In some embodiments, another profile may be downloaded at a later time point by the server 110 onto the eUICC 130, as depicted by step S305 in FIG. 2. In this case, the server 110 may send a download complete notification to the OTA system 121 in step S306, to inform the OTA system of the new profile download.

Upon receiving this notification, the OTA system 121 may search the profiles list for a backlog corresponding to the indicated profile in step S307, and provide the OTA campaign stored within the found backlog to the eUICC 130 in step S308. The eUICC 130 may execute the APDU command within the OTA campaign to update the profile accordingly. In this way, it is ensured that any changes made to a profile before its re-downloading are incorporated into the (new) profile.

Figure 3:
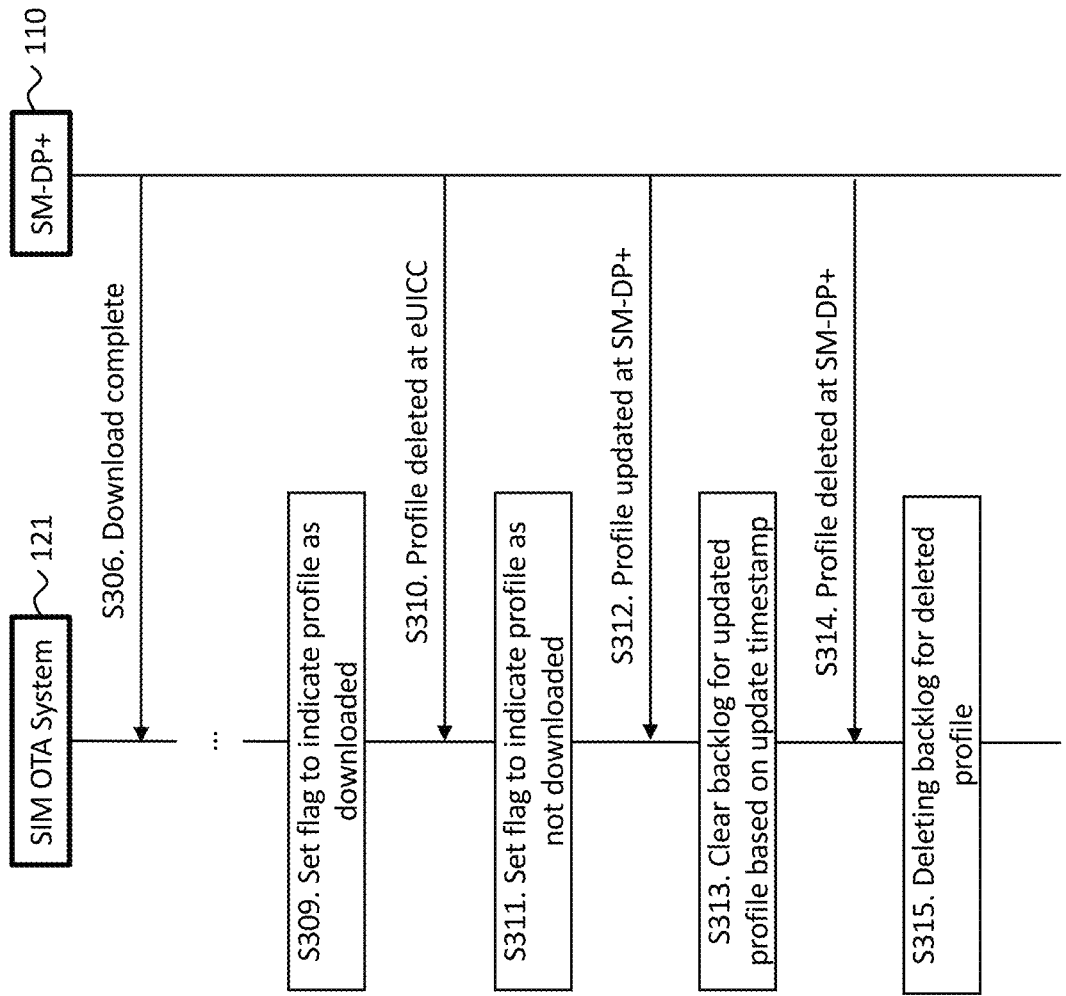
FIG. 3 shows further steps of the method for updating subscriber profiles on an eUICC according to an embodiment.

FIG. 3 shows further steps of the method for updating subscriber profiles on an eUICC according to an embodiment. The signal diagram may be seen as a continuation of the signal diagram of FIG. 2 and emphasizes steps performed at the SIM OTA system (operator system, operator server) 121 upon receiving certain notifications from the SM-DP+ server 110. The notification from the server may be received over the adapted E2+ interface 112 in FIG. 1.

The OTA system 121 may receive a plurality of notifications from the server 110, selected from at least the set {download complete, profile deleted at eUICC, profile updated at SM-DP+, profile deleted at SM-DP+}. Based on these notifications the OTA system manages the profiles list and the backlogs stored therein. The order of receiving these notifications is not fix. The notifications may be received independently of each other.

In a preferred embodiment, upon receiving a download complete notification (in step S306), indicating a profile successfully downloaded onto the eUICC, the OTA system 121 may update in step S309 the flag in the profiles list entry corresponding to the downloaded profile, to indicate that the profile has been downloaded. That is, the OTA system may change the flag from "not-downloaded" to "downloaded". The updated profile may be indicated by the profile identifier, which is then used by the OTA system to locate the profile entry in the profiles list.

In another preferred embodiment, upon receiving in step S310 a delete notification from the server 110, indicating a profile deleted from the eUICC 130 (but still stored on the server), the OTA system 121 may update in step 5311 the flag in the profiles list entry corresponding to the deleted profile, to indicate the profile as not downloaded onto the eUICC 130. The deleted profile may be indicated by the profile identifier, which is then used by the OTA system to locate the profile entry in the profiles list.

In a further preferred embodiment, the OTA systems 121 may receive in step S312 a notification from the server 110, indicating a profile which has been updated, together with a timestamp. The timestamp indicates the baseline (also version or revision) of the profile. The timestamp may be given in form of a number denoting chronological order of profile updates. Other implementations, such as indicating the date and time of the update, are possible as well. The updated profile may be indicated by the profile identifier.

In step S313 the OTA system 121 may then clear the backlog of the updated profile from the profiles list. Preferably, all backlog entries corresponding to the updated profile with timestamps are older than the new timestamp are deleted from the profiles list.

In yet a further preferred embodiment, the OTA system 121 may receive in step 5314 a profile delete notification from the server 110, indicating that a profile has been deleted from the server, and hence would not be supported anymore for the eUICC. The deleted profile may be indicated by the profile identifier, which is then used by the OTA system to locate the profile entry in the profiles list. The OTA systems may subsequently delete in step 5315 the entire backlog for the indicated profile. Thus, profiles that are not supported anymore for the eUICC can be completed deleted from the list of profiles at the operator system.

This functionality, together with the option of adding new profiles to the list of profiles, and hence to the backlog, allow the backlog to grow dynamically and to efficiently support updating of profiles after a profile re-download or profile transfer between mobile devices.

The method for updating subscriber profiles according to the embodiments illustrated above with reference to FIGS. 2 and 3 can be carried out on the eUICC management system 100 of FIG. 1. However, this necessitates certain modifications on system level, such as adapting the interfaces 111 and 114 to support the signaling needed for implementing the claimed method.

In particular, the interface E2+ 112 is adapted to facilitate signaling between the operator system (i.e., the OTA system 121) and the server (i.e., the SM-DP+ server 110). Over this interface the operator system 121 may receive the profiles list from the server 110. Further, the operator system 121 may receive from the server 110 over the interface 112 a plurality of messages indicating a status of a profile. Examples of such messages are the notifications sent in steps S306, S310, S312, S314 depicted in FIG. 3, in particular {download complete, profile deleted at eUICC, profile updated at SM-DP+, profile deleted at SM-DP+}.

Further, the interface ES6 114 in FIG. 1 is adapted to support the OTA system 121 to provide to the eUICC 130 the backlogged OTA campaign, as depicted in step 5308 in FIG. 2.

The methods, interfaces and apparatus as described through the embodiments above, allow an MNO to keep the eSIM profiles on an eUICC or SIMcard updated with the latest, sometimes critical, information—even if an eSIM profile is re-downloaded. An efficient solution is thus provided for keeping all profile settings up to date when re-downloading eSIM profiles, especially when switching phones, or when a factory reset is performed.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for backlogging subscriber profiles on an embedded universal integrated circuit card, eUICC, by an operator system, the method comprising: importing a profiles list from a server, each entry in the list comprising a flag indicating whether the corresponding profile has been downloaded onto the eUICC; receiving, from a mobile network operator, MNO, a request to update a profile on the eUICC, the request comprising a profile identifier and an Over-the-Air, OTA, campaign; and performing a backlog of the OTA campaign for the profile indicated by the profile identifier under consideration of the flag in the corresponding profile entry.

2. The method according to claim 1, wherein performing a backlog of the OTA campaign comprises:
checking the flag of the profiles list entry corresponding to the profile identifier, and
storing the OTA campaign for the profiles list entries for which the respective flag indicates that the corresponding profile has not been downloaded onto the eUICC.

3. The method according to claim 2, comprising if the flag indicates that the profile has been downloaded onto the eUICC, sending the OTA campaign to the eUICC.

4. The method according to claim 1, further comprising upon receiving a download complete notification from the server, indicating a profile that has been downloaded onto the eUICC, searching the profile lists for a backlog corresponding to the indicated profile, and providing the backlogged OTA campaign to the eUICC.

5. The method according to claim 1, wherein the OTA campaign comprises at least one remote file management command, in particular, an APDU command, for performing remote management on profiles stored on the eUICC, and wherein performing a backlog of the OTA campaign comprises storing the at least one remote file management command for the respective profile in the corresponding entry of the profiles list.

6. The method according to claim 1, comprising upon receiving the download complete notification from the server, indicating a profile downloaded onto the eUICC, updating the flag in the profiles list entry corresponding to the downloaded profile, to indicate that the profile has been downloaded.

7. The method according to claim 1, comprising:
receiving a delete notification from the server, indicating a profile deleted from the eUICC; and
updating the flag in the profiles list entry corresponding to the deleted profile, to indicate the profile as not downloaded onto the eUICC.

8. The method according to claim 1, wherein each entry in the profiles list comprises a timestamp indicating an update of the corresponding profile at the server.

9. The method according to claim 8, comprising: receiving a profile update notification from the server, the profile update notification comprising a new timestamp, indicating the last update of the profile performed at the server; and clearing the backlog of the updated profile from the profiles list, by deleting all backlog entries from the profiles list corresponding to the updated profile with timestamps older than the new timestamp.

10. The method according to claim 1, comprising receiving a profile delete notification from the server, indicating a profile removed from the server, and deleting the backlog for the indicated profile.

11. A remote eUICC profile management system, comprising:
a mobile network operator, MNO, comprising an operator system;
a server, in particular a Subscription Manager-Data Preparation and Secure Routing, SM-DP+, Server;
a mobile device, the mobile device comprising an embedded Universal Integrated Circuit Card, eUICC, and a Local Profile Assistant, LPA;
a first interface between the operator system and the server; and
a second interface between the operator system and the eUICC;
wherein the operator system is configured to receive over the first interface a profiles list and a plurality of messages indicating a status of a profile at the server, to implement the method according to claim 1, and to provide over the second interface a backlogged OTA campaign order to the eUICC indicating updates to a profile to be performed at the eUICC.

12. An apparatus for backlogging subscriber profiles on an embedded universal integrated circuit card, eUICC, configured to:—import a profiles list from a server, each entry in the list comprising a flag indicating whether the corresponding profile has been downloaded onto the eUICC;—receive, from a mobile network operator, MNO, a request to update a profile on the eUICC, the request comprising a profile identifier and an Over-the-Air, OTA, campaign; and—perform a backlog of the OTA campaign for the profile indicated by the profile identifier under consideration of the flag in the corresponding profile entry.

13. The apparatus according to claim 12, configured to upon receiving a download complete notification from the server, indicating a profile that has been downloaded onto the eUICC, search the profiles list for a backlog corresponding to the indicated profile, and provide the backlogged OTA campaign to the eUICC.

14. The apparatus according to claim 12, configured to receive a profile delete notification from the server, and to update the flag in the entry corresponding to the deleted profile in the profiles list, to indicate the profile as not downloaded onto the eUICC.

15. The apparatus according to claim 12, configured to receive a profile update notification from the server, the profile update notification comprising a timestamp, indicating the last update of the profile, and to clear the backlog of the updated profile from the profiles list according to the timestamp.

16. A method for backlogging subscriber profiles on an embedded universal integrated circuit card, eUICC, by an operator system, the method comprising: importing a profiles list from a server comprising a plurality of entries, each entry in the list corresponding to one of the profiles and comprising a flag indicating whether the corresponding profile has been downloaded onto the eUICC; receiving, from a mobile network operator, MNO, a request to update a profile on the eUICC, the request comprising a profile identifier and an Over-the-Air, OTA, campaign; and creating a backlog of the OTA campaign for the profile indicated by the profile identifier under consideration of the flag in the corresponding profile entry.

* * * * *